(12) United States Patent
Kim et al.

(10) Patent No.: US 8,244,318 B2
(45) Date of Patent: Aug. 14, 2012

(54) HINGE DEVICE AND MOBILE TERMINAL INCLUDING THE SAME

(75) Inventors: Sunghan Kim, Seoul (KR); Younghwan Kim, Seoul (KR); Hayong Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 35 days.

(21) Appl. No.: 12/885,021

(22) Filed: Sep. 17, 2010

(65) Prior Publication Data

US 2011/0077062 A1    Mar. 31, 2011

(30) Foreign Application Priority Data

Sep. 29, 2009    (KR) .................. 10-2009-0092580

(51) Int. Cl.
*H04M 1/00*    (2006.01)
(52) U.S. Cl. ....................... 455/575.3; 16/221
(58) Field of Classification Search ..... 455/575.3–575.4
See application file for complete search history.

(56) References Cited

U.S. PATENT DOCUMENTS 6,917,824 B2 *    7/2005    Kobayashi ............... 455/575.3

* cited by examiner

*Primary Examiner* — Vladimir Magloire
(74) *Attorney, Agent, or Firm* — Birch, Stewart, Kolasch & Birch, LLP

(57) ABSTRACT

A mobile terminal is disclosed. The mobile terminal includes a first body forming the external appearance of the mobile terminal, a second body rotatably coupled to the first body, the second body forming the external appearance of the mobile terminal, and a coupling unit for rotatably coupling the first body and the second body to each other. The coupling unit includes a hinge housing fixedly coupled to the first body, an outer head fixedly coupled to the second body, an inner head disposed between the hinge housing and the outer head so as to generate a collision sound during rotation of the inner head, a cam mounted in the hinge housing such that the cam contacts the inner head, and an elastic spring mounted in the hinge housing for providing elastic force to the cam.

20 Claims, 6 Drawing Sheets

HINGE DEVICE AND MOBILE TERMINAL INCLUDING THE SAME

CROSS-REFERENCE TO RELATED APPLICATION

This application claims the priority benefit of Korean Patent Application No. 10-2009-0092580, filed on Sep. 29, 2009 in the Korean Intellectual Property Office, the disclosure of which is incorporated herein by reference.

BACKGROUND OF THE INVENTION

1. Field of the Invention

The present invention relates to a hinge device and a mobile terminal including the same, and more particularly to a hinge device wherein uniformity of a collision sound during folding of a mobile terminal is improved and free movement of the mobile terminal is prevented and a mobile terminal including the same.

2. Description of the Related Art

A mobile terminal is a portable device having at least one of functions including a function to perform voice and video communication, a function to input and output information, and a function to store data. With increasing functional diversification, such a mobile terminal now has complex functions, such as capture of a still image or a moving image, playback of a music file or a moving image file, gaming, reception of broadcasting, wireless Internet, and the like. That is, the mobile terminal also functions as a multimedia player.

Also, the mobile terminal is regarded as a personal belonging that expresses personality of a user, with the result that the mobile terminal is required to be manufactured in various designs. Examples of such designs may include a bar type structure, a slider type structure, a folder type structure, a swivel type structure, and the like. However, it is increasingly difficult to implement various designs and various structures.

In a conventional folder type mobile terminal, a collision sound is uniformly generated during folding of the mobile terminal, with the result that a user may not hear the collision sound. In this case, the user may mistakenly believe that the mobile terminal is not fully closed. For this reason, it is necessary to improve the folding structure of the mobile terminal.

Also, free movement of a hinge structure provided in the mobile terminal occurs in a free stop in which the mobile terminal is at a predetermined angle, which is different from a fully open state or a closed state.

SUMMARY OF THE INVENTION

Therefore, the present invention has been made in view of the above problems, and it is an object of the present invention to provide a hinge device wherein uniformity of a collision sound during folding of a mobile terminal is improved and free movement of the mobile terminal is prevented and a mobile terminal including the same.

In accordance with an aspect of the present invention, the above and other objects can be accomplished by the provision of a mobile terminal including a first body forming the external appearance of the mobile terminal, a second body rotatably coupled to the first body, the second body forming the external appearance of the mobile terminal, and a coupling unit for rotatably coupling the first body and the second body to each other, wherein the coupling unit includes a hinge housing fixedly coupled to the first body, an outer head fixedly coupled to the second body, an inner head disposed between the hinge housing and the outer head for generating a collision sound during rotation of the inner head, a cam mounted in the hinge housing such that the cam contacts the inner head, and an elastic spring mounted in the hinge housing for providing elastic force to the cam.

In accordance with another aspect of the present invention, there is provided a hinge device for rotatably coupling a first body and a second body to each other, the hinge device including a hinge housing fixedly coupled to the first body, an outer head fixedly coupled to the second body, an inner head disposed between the hinge housing and the outer head for generating a collision sound during rotation of the inner head, a cam mounted in the hinge housing such that the cam contacts the inner head, and an elastic spring mounted in the hinge housing for providing elastic force to the cam.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Exemplary embodiments of the present invention will be described with reference to the attached drawings. The terms "module" and "unit," when attached to the names of components, are used herein to help the understanding of the components and thus they should not be considered as having specific meanings or roles. Accordingly, the terms "module" and "unit" may be used interchangeablely.

A mobile terminal as described in this specification may include a mobile phone, a smart phone, a laptop computer, a digital broadcast terminal, a personal digital assistant (PDA), a portable multimedia player (PMP), and a navigator.

Figure 1:
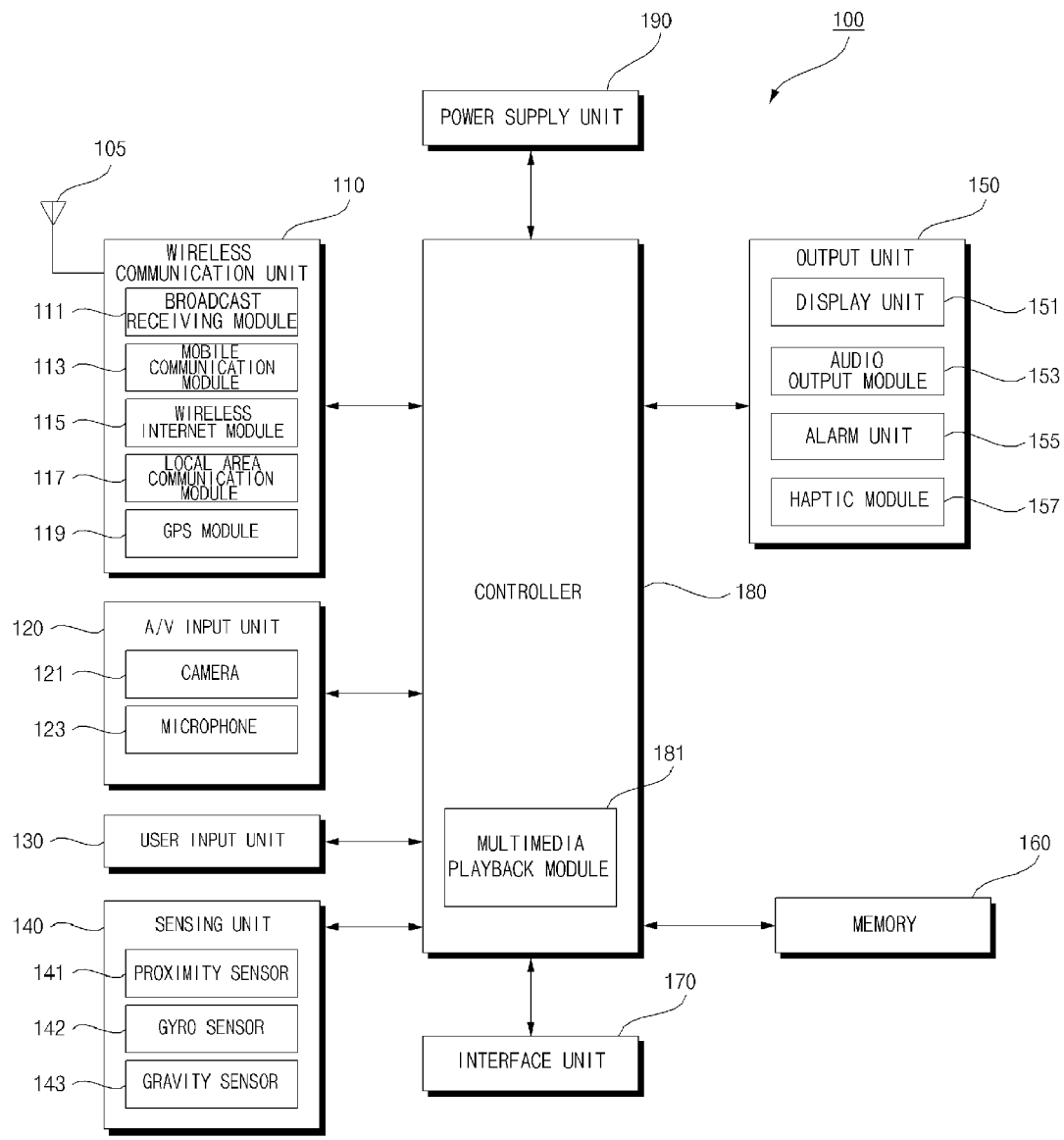
FIG. 1 is a block diagram illustrating a mobile terminal according to an embodiment of the present invention.

FIG. 1 is a block diagram illustrating a mobile terminal according to an embodiment of the present invention. The mobile terminal according to this embodiment of the present invention will be described below with reference to FIG. 1 in terms of functional components thereof.

Referring to FIG. 1, a mobile terminal 100 may include a wireless communication unit 110, an audio/video (A/V) input unit 120, a user input unit 130, a sensing unit 140, an output unit 150, a memory 160, an interface unit 170, a controller 180, and a power supply unit 190. In actual implementation, two or more of these components may be incorporated into a single component, or one component may be configured separately as two or more components, as needed.

The wireless communication unit 110 may include at least one module that enables wireless communication between the mobile terminal 100 and a wireless communication system or between the mobile terminal 100 and a network within which the mobile terminal 100 is located. For example, the wireless communication unit 110 may include an antenna 105, a broadcast receiving module 111, a mobile communication module 113, a wireless Internet module 115, a local area communication module 117, and a global positioning system (GPS) module 119.

The broadcast receiving module 111 receives a broadcast signal and/or broadcasting-related information from an external broadcast management server through a broadcast channel. The broadcast channel may be a satellite channel, a terrestrial channel, or the like. The broadcast management server may be a server that generates and transmits a broadcast signal and/or broadcasting-related information or a server that receives a generated broadcast signal and/or generated broadcasting-related information and transmits the generated broadcast signal and/or the generated broadcasting-related information to a terminal.

The broadcasting-related information may be information related to a broadcast channel, a broadcast program, or a broadcast service provider. The broadcast signal may not only include a TV broadcast signal, a radio broadcast signal, or a data broadcast signal but also a broadcast signal in which a data broadcast signal is combined with a TV broadcast signal or a radio broadcast signal. The broadcasting-related information may also be provided through a mobile communication network. In this case, the broadcasting-related information may be received by the mobile communication module 113. The broadcasting-related information may be provided in various forms. For example, the broadcasting-related information may be provided in the form of an electronic program guide (EPG) of digital multimedia broadcasting (DMB) or an electronic service guide (ESG) of digital video broadcast-handheld (DVB-H).

The broadcast receiving module 111 receives a broadcast signal using a variety of broadcast systems. Specifically, the broadcast receiving module 111 may receive a digital broadcast signal using a digital broadcast system, such as digital multimedia broadcasting-terrestrial (DMB-T), digital multimedia broadcasting-satellite (DMB-S), media forward link only (MediaFLO), digital video broadcast-handheld (DVB-H), or integrated services digital broadcast-terrestrial (ISDB-T). Also, the broadcast receiving module 111 may be configured to be suitable not only for such a digital broadcast system but also for any other broadcast system that provides a broadcast signal. A broadcast signal and/or broadcasting-related information received through the broadcast receiving module 111 may be stored in the memory 160.

The mobile communication module 113 transmits and receives a wireless signal to and from at least one selected from a group consisting of a base station, an external terminal, and a server over a mobile communication network. The wireless signal may include a voice call signal, a video call signal, or various types of data associated with transmission and reception of a text/multimedia message.

The wireless Internet module 115 is an internal or external module for wireless Internet access which may be provided to the mobile terminal 100. The wireless Internet module 115 may use wireless Internet technology, such as wireless LAN (WLAN) (Wi-Fi), wireless broadband (WiBro), world interoperability for microwave access (WiMAX), or high speed downlink packet access (HSDPA).

The local area communication module 117 is a module for local area communication. For example, Bluetooth, radio frequency identification (RFID), infrared data association (IrDA), ultra wideband (UWB), or ZigBee may be used as local area communication technology.

The GPS module 119 is a module configured to acquire a location of the mobile terminal 100. The GPS module 119 receives location information from a plurality of GPS satellites.

The antenna 105 is a communication device configured to receive all radio waves or signals directed to the mobile terminal 100. The antenna 105 may be provided inside or outside the mobile terminal 100. The antenna 105 may receive radio waves or signals transmitted from the outside irrespective of names of the transmitted radio waves or the transmitted signals.

The A/V input unit 120 is provided to input an audio signal or a video signal. The A/V input unit 120 may include a camera 121 and a microphone 123. The camera 121 processes an image frame, such as a still image or a moving image, obtained through an image sensor in a video communication mode or an image capture mode. The processed image frame may be displayed on the display unit 151.

The image frame processed by the camera 121 may be stored in the memory 160 or may be transmitted to the outside through the wireless communication unit 110. Two or more cameras 121 may be provided depending on how the mobile terminal is constructed.

The microphone 123 receives an external audio signal in a communication mode, a record mode, or a voice recognition mode and processes the received audio signal into electrical audio data. In the communication mode, the processed audio data may be converted into a form transmittable to a mobile communication base station through the mobile communication module 113. A variety of noise removal algorithms may be used to remove noise generated in the course of receiving an external audio signal through the microphone 123.

The user input unit 130 generates key input data corresponding to a key input operation that a user has performed to control the operation of the mobile terminal. The user input unit 130 may include a keypad, a dome switch, a (resistive/capacitive) touchpad, a jog wheel, a jog switch, a finger mouse, or the like. In a case in which the touchpad constitutes a layered structure with the display unit 151, which will be described later, the touchpad may be referred to as a "touch screen."

The sensing unit 140 detects a current state of the mobile terminal 100, such as whether the mobile terminal 100 is opened or closed, where the mobile terminal 100 is located, or whether or not the user has contacted the mobile terminal 100, and generates a sensing signal for controlling the operation of the mobile terminal 100. For example, the sensing unit 140 may sense whether the mobile terminal 100 is open or closed in a slide manner in a case in which the mobile terminal 100 is a slide phone. Also, the sensing unit 140 may also be responsible for sensing functions associated with whether or not power is supplied to the power supply unit 190 or whether or not the interface unit 170 is coupled to an external device.

The sensing unit 140 may include a proximity sensor 141. The proximity sensor 141 can detect the presence or absence of an object that is approaching or near to the mobile terminal 100 without physical contact. The proximity sensor 141 can detect a nearby object based on a change in AC magnetic fields or a change in magnetostatic fields or based on a variation rate of capacitance. Examples of the proximity sensor 141 may include a transmissive photoelectric sensor, a direct reflective photoelectric sensor, a mirror reflective photoelectric sensor, a high frequency oscillation proximity sensor, a capacitive proximity sensor, a magnetic proximity sensor, an infrared proximity sensor, or the like. Two or more proximity sensors 141 may be provided depending on how the mobile terminal is constructed.

The sensing unit 140 may include a gyro sensor 142. The gyro sensor 142 may include a sensor for sensing movement of an object using a gyroscope, an inertia sensor, and an acceleration sensor. The gyroscope may include a mechanical gyroscope, a loop type laser gyroscope, an optical fiber gyroscope, or the like. The gyro sensor 142 senses movement of the mobile terminal to provide a signal for controlling the mobile terminal.

The sensing unit 140 may include a gravity sensor 143. The gravity sensor 143 may include all kinds of sensors that can sense a rotation state of the mobile terminal. The gravity sensor 143 can sense a current rotation state of the mobile terminal based on a change in resistance of a variable resistor, to which a weight is connected, during rotation of the mobile terminal or based on a direction in which a conductive object, which is disposed in the center of the mobile terminal, contacts the mobile terminal during rotation of the mobile terminal.

The output unit 150 is provided to output an audio signal, a video signal, or an alarm signal. The output unit 150 may include the display unit 151, an audio output module 153, an alarm unit 155, and a haptic module 157.

The display unit 151 displays information processed in the mobile terminal 100. For example, in a case in which the mobile terminal 100 is in a communication mode, the display unit 151 displays a communication-related user interface (UI) or graphical user interface (GUI). In a case in which the mobile terminal 100 is in a video communication mode or an image capture mode, the display unit 151 may individually or simultaneously display captured or received images. Also, the display unit 151 may display a corresponding UI or GUI.

In a case where the display unit 151 forms a layered structure together with the touchpad so as to construct a touch screen as described above, the display unit 151 may not only be used as an output device but may also be used as an input device. In a case where the display unit 151 is embodied as a touch screen, the display unit 151 may include a touch screen panel, a touch screen panel controller, and the like. The touch screen panel is a transparent panel externally attached to the mobile terminal 100. The touch screen panel may be connected to an internal bus of the mobile terminal 100.

The touch screen panel may be configured to convert pressure applied to a specific region of the display unit 151 or change of capacitance generated at the specific region of the display unit 151 into an electric input signal. The touch screen panel may be configured to not only detect touch position and touch area but also to detect touch pressure.

The touch screen panel monitors touches and sends, upon detecting a touch input, corresponding signals to the touch screen panel controller. The touch screen panel controller processes the signals and transmits the resulting data to the controller 180. The controller 180 determines whether or not touch input has occurred and which region of the touch screen has been touched.

The display unit 151 may include at least one selected from a group consisting of a liquid crystal display, a thin film transistor-liquid crystal display, organic light-emitting diodes (OLED), a flexible display, and a three-dimensional display (3D display).

Some of the above-specified displays may be configured in a transparent structure or in an optical transmissive structure such that one can see through the screen and out the back of the display. Such displays may be referred to as transparent displays. A representative example of the transparent displays may be transparent OLED (TOLED). The rear of the display unit 151 may be configured in an optical transmissive structure. In this structure, it is possible for a user to see things behind a mobile terminal body through a region, occupied by the display unit 151, of the mobile terminal body.

Two or more display units 151 may be provided depending on how the mobile terminal 100 is constructed. For example, the mobile terminal 100 may include both an external display unit (not shown) and an internal display unit (not shown).

The audio output module 153 outputs audio data received from the wireless communication unit 110 or stored in the memory 160 when the mobile terminal 100 is in an incoming call mode, a communication mode, a record mode, a voice recognition mode, or a broadcast receiving mode. Also, the audio output module 153 outputs audio signals associated with functions performed by the mobile terminal 100, for example, an audio signal associated with an incoming call sound or a message received sound. The audio output module 153 may include a receiver, a speaker, a buzzer, or the like.

The alarm unit 155 outputs a signal notifying the user that an event has occurred in the mobile terminal 100. Examples of the event occurring in the mobile terminal 100 include incoming call reception, message reception, and key signal input. The alarm unit 155 outputs a signal notifying the user of the occurrence of an event in a different form from an audio signal or a video signal. For example, the alarm unit 155 may output a notification signal through vibration. When an incoming call signal is received or when a message is received, the alarm unit 155 may output a signal indicating the reception of the incoming call signal or the message. Also, when a key signal is input, the alarm unit 155 may output a feedback signal to the key signal input. A user can perceive the event occurrence through the signal output from the alarm unit 155. Of course, the signal indicating the event occurrence may also be output through the display unit 151 or the audio output module 153.

The haptic module 157 generates a variety of tactile effects which the user can sense. One typical example of the tactile effects that can be generated by the haptic module 157 is vibration. In a case where the haptic module 157 generates vibration as a tactile effect, the haptic module 157 may change intensity and pattern of generated vibration. Also, the haptic module 157 may combine different vibrations and output the combined vibration, or may sequentially output different vibrations.

In addition to vibration, the haptic module 157 may generate various tactile effects, such as a stimulus effect by an arrangement of pins that move perpendicularly to the touched skin surface, a stimulus effect by air blowing or suction through an air outlet or inlet, a stimulus effect through brushing of the skin surface, a stimulus effect through contact with an electrode, a stimulus effect using electrostatic force, and a stimulus effect through reproduction of thermal (cool/warm) sensation using an endothermic or exothermic element. The haptic module 157 may be implemented so as to allow the user to perceive such effects not only through direct tactile sensation but also through kinesthetic sensation of fingers, arms, or the like of the user. Two or more haptic modules 157 may be provided depending on how the mobile terminal 100 is constructed.

The memory 160 may store a program based on which the controller 180 performs a processing and controlling operation. Also, the memory 160 may temporarily store input or output data items (for example, a phonebook, messages, still images, moving images, and the like).

The memory 160 may include at least one of storage media including a flash memory type memory, a hard disk type memory, a multimedia card micro type memory, a card memory type memory (for example, an SD or XD memory), a random access memory (RAM), a static random access memory (SRAM), a read-only memory (ROM), an electrically erasable programmable read-only memory (EEPROM), a programmable read-only memory (PROM), a magnetic memory, a magnetic disc, and an optical disc. Also, the mobile terminal 100 may utilize web storage that performs a storage function of the memory 160 over the Internet.

The interface unit 170 functions to interface with all external devices connected to the mobile terminal 100. Examples of the external devices connected to the mobile terminal 100 include a wired/wireless headset, an external battery charger, a wired/wireless data port, a memory card, a card socket such as a subscriber identification module/user identity module (SIM/UIM) card socket, an audio input/output (I/O) terminal, a video I/O terminal, and an earphone. The interface unit 170 may receive power or data from such an external device and provide the same to each internal component of the mobile terminal 100. Also, the interface unit 170 may transmit internal data of the mobile terminal 100 to the external device.

When the mobile terminal 100 is connected to an external cradle, the interface unit 170 may be used as a channel through which the connected cradle supplies power to the mobile terminal 100 or a channel through which a variety of command signals input to the cradle by a user are transferred to the mobile terminal 100. The various command signals or the power input from the cradle may function as a signal for enabling the user to perceive that the mobile terminal is correctly mounted in the cradle.

The controller 180 generally controls the operation of each component to control the overall operation of the mobile terminal 100. For example, the controller 180 performs control and processing associated with voice communication, data communication, video communication, and the like. The controller 180 may include a multimedia playback module 181 for multimedia reproduction. The multimedia playback module 181 may be implemented as hardware in the controller 180 or may be implemented as software that is separate from the controller 180. The controller 180 may perform pattern recognition processing in which written input or drawing input carried out on the touch screen is recognized as a letter or as an image.

Under control of the controller 180, the power supply unit 190 receives external power or internal power and supplies power required for operation to each component.

In the above description, the mobile terminal 100 according to the present invention was described in terms of functional components thereof. Hereinafter, the mobile terminal 100 according to the present invention will be described with reference to FIG. 2 in terms of structural components thereof. In the following description, a folder type mobile terminal will be described as an example for the convenience of description. However, the present invention is not limited to such a folder type mobile terminal. For example, the present invention is applicable to other types of mobile terminals, such as a bar type mobile terminal, a swing type mobile terminal, a slider type mobile terminal, and the like.

Figure 2:
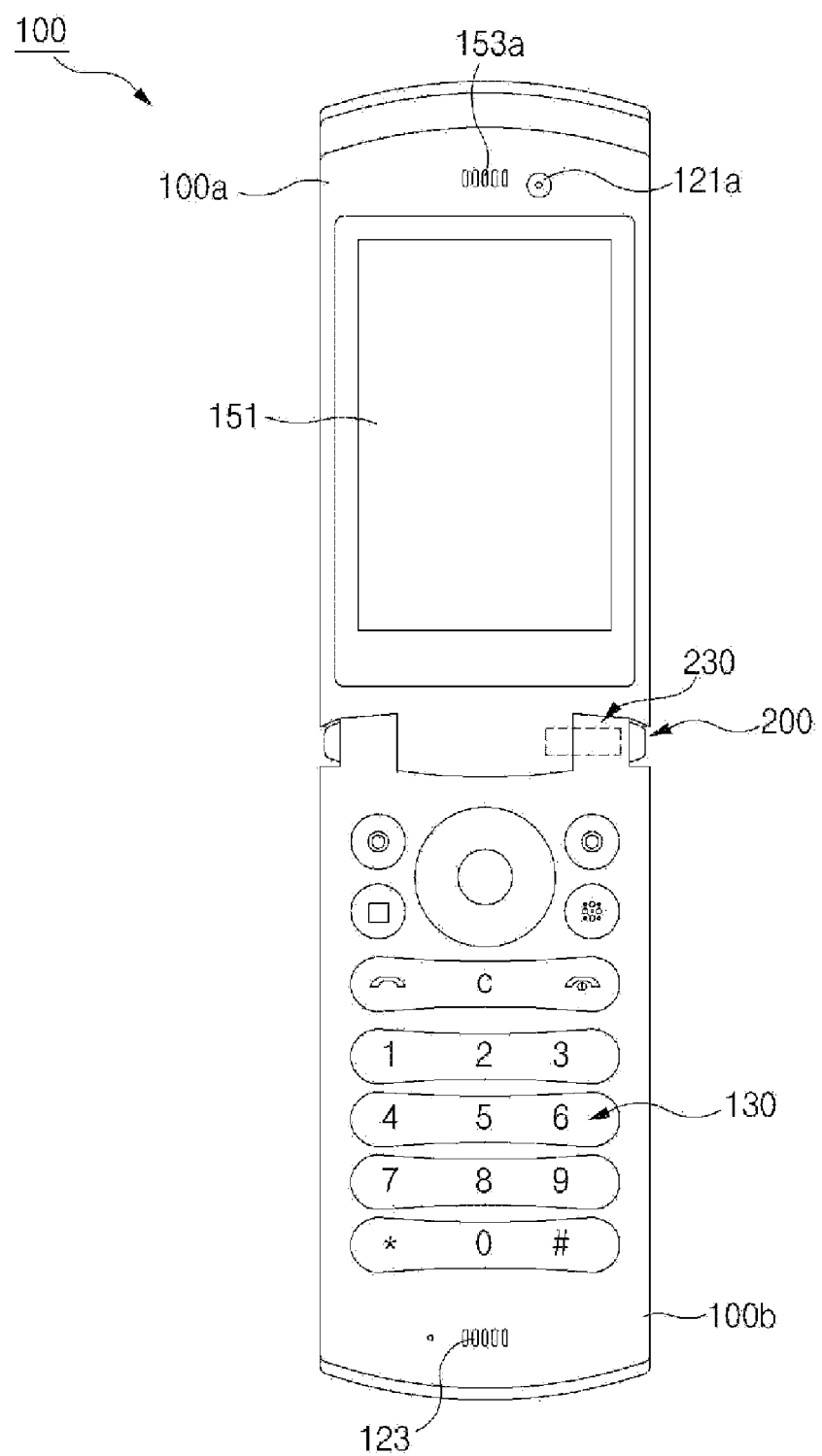
FIG. 2 is a view illustrating the front of a mobile terminal according to an embodiment of the present invention in a state in which the mobile terminal is opened.

FIG. 2 is a view illustrating the front of the mobile terminal according to the embodiment of the present invention shown in FIG. 1 in a state in which the mobile terminal is opened.

Referring to FIG. 2, the mobile terminal 100 includes a first body 100a forming the external appearance of the mobile terminal 100 and a second body 100b rotatably coupled to the first body 100a. The second body 100b also forms the external appearance of the mobile terminal 100. The mobile terminal 100 may be switched between a closed configuration and an open configuration through relative movement of the first body 100a and the second body 100b.

A state in which the first body 100a and the second body 100b overlap may be referred to as a closed configuration, and a state in which the first body 100a and the second body 100b are at a predetermined angle may be referred to as an open configuration. Also, a section between the open configuration and the closed configuration may be referred to as a free stop.

In the closed configuration, the mobile terminal 100 is operated mainly in a standby mode, but the standby mode may be cancelled through user manipulation. In the open configuration, the mobile terminal 100 is operated mainly in a communication mode, but the communication mode may be switched to the standby mode through user manipulation or with passage of predetermined time.

Various electronic components may be mounted in the first body 100a and the second body 100b. Cases forming the external appearances of the first body 100a and the second body 100b may be made of an injection-molded synthetic resin. Alternatively, the cases may be made of a metal material, such as stainless steel (STS) or titanium (Ti).

The mobile terminal 100 includes a coupling unit 200 for rotatably coupling the first body 100a and the second body 100b to each other. Preferably, the coupling unit 200 is implemented as a hinge structure via which the first body 100a and the second body 100b can be rotatably connected to each other. Depending upon embodiments of the present invention, the coupling unit 200 may be configured in a slider or plate type coupling structure, a rotary coupling structure, a screw coupling structure, or a spherical coupling structure such that the coupling unit 200 can be applied to various types of mobile terminals, such as a swing type mobile terminal or a slider type mobile terminal. In this embodiment, the coupling unit 200 is provided with a hinge device 230, the construction of which will be described later with reference to FIG. 3.

The first body 100a may include a display unit 151, a first audio output module 153a, and a first camera 121a. The second body 100b may include a user input unit 130 and a microphone 123.

The display unit 151 includes a liquid crystal display (LCD) or an organic light emitting diode (OLED) display which visually shows information. A touchpad may overlap the display unit 151 in a layered structure such that the display unit 151 can be operated as a touch screen through which information can be input by user touch.

The first audio output module 153a may be implemented as a receiver or a speaker. The first camera 121a may be implemented to appropriately capture a still image or a moving image of the user. The microphone 123 may be implemented to appropriately receive voice of the user or other sounds.

Types of the user input unit 130 are not particularly restricted as long as the user input unit 130 can be operated in a tactile manner in which the user manipulates the user input unit 130 in a tactile sensation. For example, the user input unit 130 may be implemented as a dome switch or a touchpad which receives a command or information through user manipulation, such as push or touch. Alternatively, the user input unit 130 may be implemented as a wheel, a jog wheel or a joystick which can rotate a key.

Figure 3:
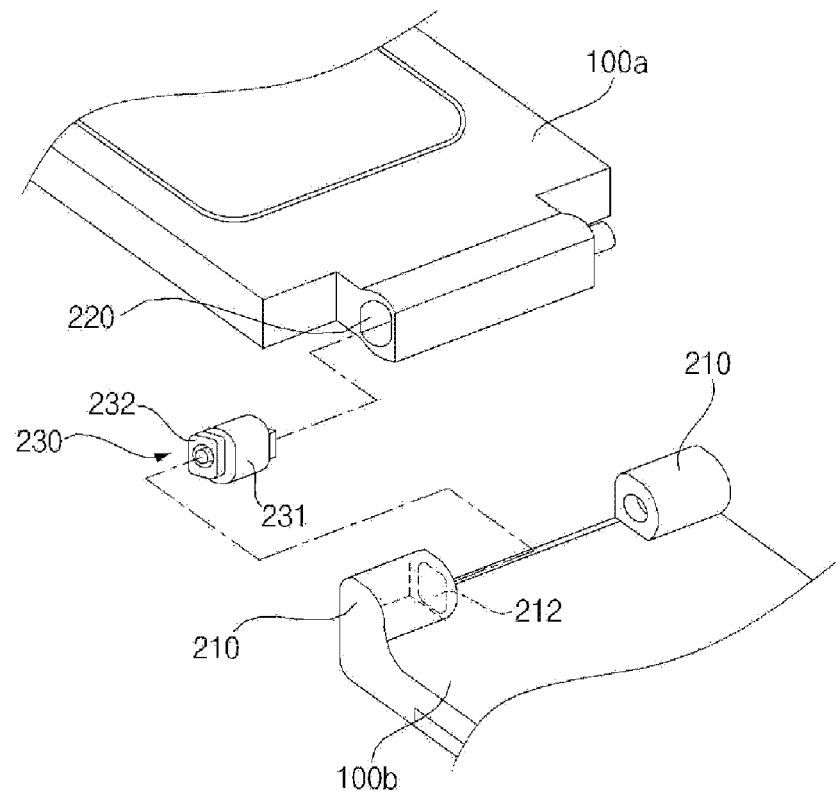
FIG. 3 is an exploded perspective view illustrating the construction of a coupling unit including a hinge device according to an embodiment of the present invention.
Figure 4:
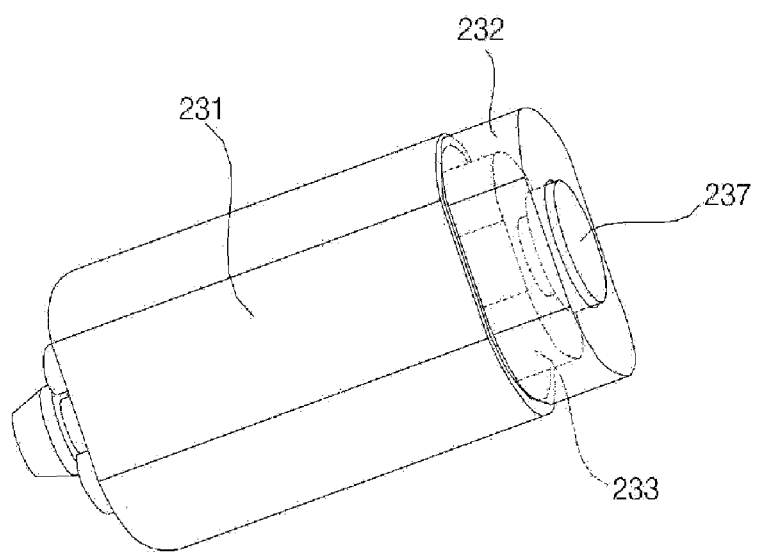
FIG. 4 is a perspective view illustrating the hinge device according to the embodiment of the present invention shown in FIG. 3.
Figure 5:
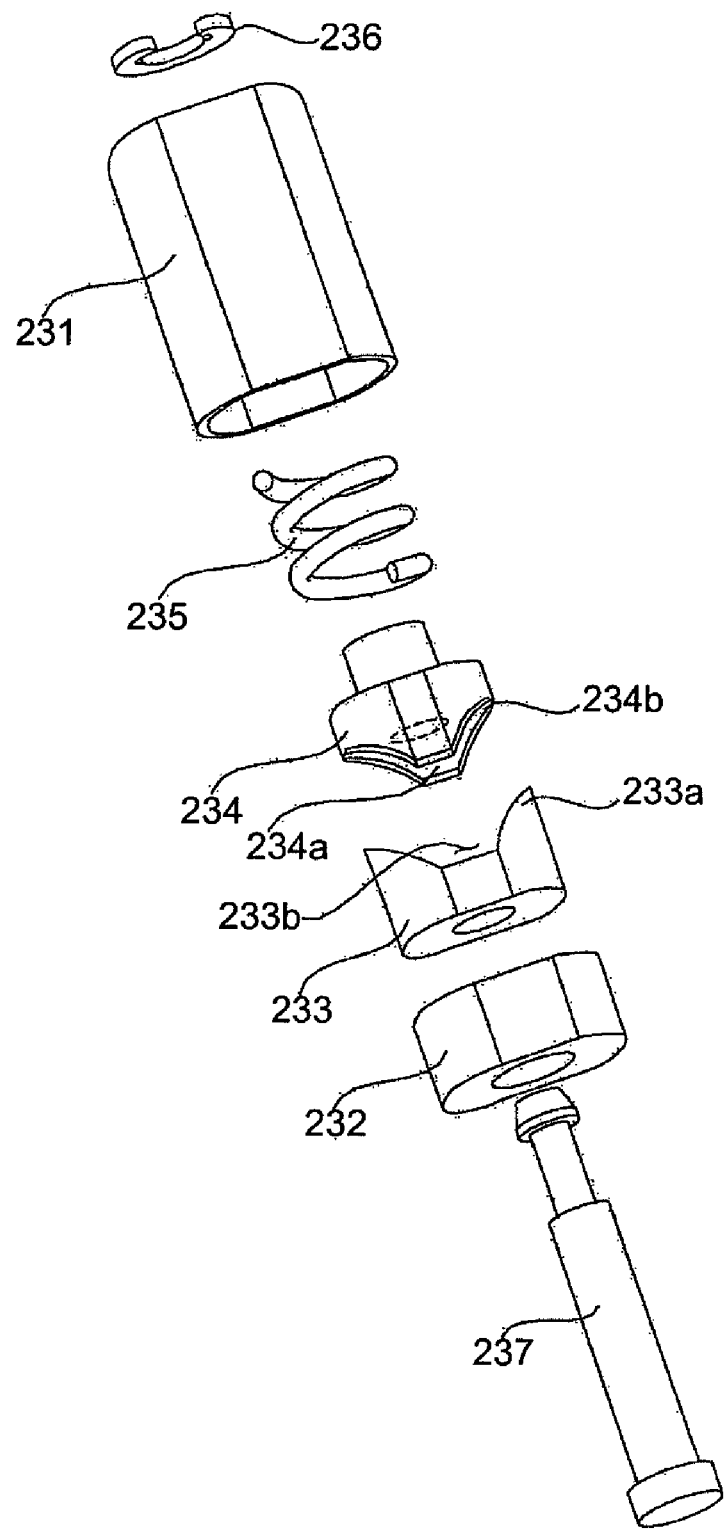
FIG. 5 is an exploded perspective view illustrating the hinge device according to the embodiment of the present invention shown in FIG. 4.

FIG. 3 is an exploded perspective view illustrating the construction of a coupling unit 200 including a hinge device 230 according to an embodiment of the present invention, FIG. 4 is a perspective view of the hinge device 230, and FIG. 5 is an exploded perspective view of the hinge device 230.

Referring to FIGS. 3 to 5, the coupling unit 200 according to this embodiment of the present invention includes a hinge device 230. The hinge device 230 includes a hinge housing 231 fixedly coupled to the first body 100a, an outer head 232 fixedly coupled to the second body 100b, an inner head 233 disposed between the hinge housing 231 and the outer head 232 so as to generate a collision sound during rotation of the inner head 233, a cam 234 mounted in the hinge housing 231 such that the cam 234 contacts the inner head 233, and an elastic spring 235 mounted in the hinge housing 231 for providing elastic force to the cam 234.

Referring specifically to FIG. 3, the hinge housing 231 is fixedly coupled in a hinge housing receiving part 220 formed in the first body 100a in a depressed manner such that the rotation of the hinge housing 231 is restricted. The hinge housing 231 is fixedly coupled in the hinge housing receiving part 220 of the first body 100a without a gap therebetween at one side of the hinge housing 231. During the rotation of the first body 100a, therefore, the hinge housing 231 is prevented from moving in the hinge housing receiving part 220 of the first body 100a. The sectional shape of the hinge housing receiving part 220 is not particularly restricted as long as the hinge housing 231 can be received in the hinge housing receiving part 220 without a gap therebetween at one side of the hinge housing 231.

The outer head 232 is fixedly coupled to the second body 100b such that the rotation of the outer head 232 is restricted. A protrusion 210 is formed at one side of the second body 100b. In the protrusion 210 is formed an outer head receiving part 212, in which the outer head 232 is received, in a depressed manner. The outer head 232 is fixedly coupled in the outer head receiving part 212 without a gap therebetween at one side of the outer head 232.

The mobile terminal 100 is rotated by relative movement between the outer head 232 fixedly coupled to the second body 100b and the hinge housing 231 fixedly coupled to the first body 100a. As a result of the rotation of the mobile terminal 100, the mobile terminal 100 is switched between the open configuration and the closed configuration.

According to another embodiment of the present invention, the outer head 232 may be fixedly coupled to the first body 100a, and the hinge housing 231 is fixedly coupled to the second body 100b. In this case, the mobile terminal 100 is rotated by relative movement between the hinge housing 231 fixedly coupled to the second body 100b and the outer head 232 fixedly coupled to the first body 100a.

Referring to FIGS. 4 and 5, the hinge device 230 according to this embodiment of the present invention includes a hinge housing 231 fixedly coupled to the first body 100a, an outer head 232 fixedly coupled to the second body 100b, an inner head 233 disposed between the hinge housing 231 and the outer head 232 for generating a collision sound during rotation thereof, a cam 234 mounted in the hinge housing 231 such that the cam 234 contacts the inner head 233, and an elastic spring 235 mounted in the hinge housing 231 for providing elastic force to the cam 234. Also, the hinge device 230 further includes a hinge pin 237 extending through the outer head 232, the inner head 233, the cam 234, the elastic spring 235, and the hinge housing 231 and a coupling member 236 for fixing one side of the hinge pin 237.

Specifically, the elastic spring 235 is mounted in the hinge housing 231. Also, the cam 234 is mounted in the hinge housing 231 such that the cam 234 can reciprocate linearly along the inner circumference of the hinge housing 231. The hinge housing 231 is fixedly coupled in the hinge housing receiving part 220 formed in the first body 100a or the second body 100b in a depressed manner depending upon embodiments of the present invention.

In the outer head 232 has an insertion hole 232c (see FIG. 6) in which the inner head 233 is received. The inner head 233 is received in the insertion hole 232c with a gap G (see FIG. 6) at one side of the inner head 233. Also, the inner head 233 is fully inserted into the outer head 232, with the result that, as shown in FIG. 4, the inner head 233 is not exposed to the outside. The outer head 232 is fixedly coupled in the outer head receiving part 212 formed in the first body 100a or the second body 100b in a depressed manner depending upon embodiments of the present invention.

The inner head 233 has a smaller diameter than the outer head 232 such that the gap G is defined between the inner head 233 and the outer head 232. Preferably, the outer diameter of the inner head 233 is less by a ratio of 5/100 than the inner diameter of the outer head 232. When the inner head 233 and the outer head 232 are rotated around an axis of the hinge pin 237, one side of the inner head 233 is minutely moved due to the gap G therebetween, with the result that a collision sound is generated. The generation of the collision sound will be described later with reference to FIG. 6.

Inner head protrusions 233a, which protrude in the shape of a peak, and inner head depressions 233b, which are depressed in the shape of a valley, are formed at one side of the inner head 233. During the rotation of the inner head 233, the inner head protrusions 233a and the inner head depressions 233b linearly reciprocate the cam 234 to the inside of the hinge housing 231.

The cam 234 has valley-shaped cam depressions 234b corresponding to the inner head protrusions 233a and peak-shaped cam protrusions 234a corresponding to the inner head depressions 233b. The cam 234 is coupled in the hinge housing 231 such that the rotation of the cam 234 is restricted. No gap is defined between the cam 234 and the hinge housing 231 at one side of the cam 234, with the result that relative movement between the cam 234 and the inner wall of the hinge housing 231 does not occur, and therefore, noise is not generated. The cam is linearly moved only in the longitudinal direction of the hinge housing 231.

The elastic spring 235 mounted in the hinge housing 231 to provide elastic force to the cam 234 is disposed below the cam 234.

The cam 234 reciprocates linearly in the axial direction of the hinge pin 237. That is, when the outer head 232 is rotated, the inner head 233 is rotated while one side of the inner head 233 is minutely moved due to the gap G therebetween. At this time, the inner head protrusions 233a formed at one side of the inner head 233 push the cam 234 to the inside of the hinge housing 231 along inclined planes formed at the cam 234.

As a result, the elastic spring 235 is compressed, and the compressed elastic spring 235 provides elastic repulsive force to the cam 234 pushed to the inside of the hinge housing 231. At this time, the cam 234 pushes the inner head 233 by the elastic force of the elastic spring 235. When the inner head 233 is pushed by the cam 234, a flat plane (not shown) at the outside of the inner head 233 comes into tight contact with a flat plane (not shown) at the inside of the outer head 232, with the result that relative movement between the outer head 232 and the inner head 233 does not occur. That is, friction between the inner head 233 and the outer head 232 is generated due to the elastic force provided by the elastic spring 235, with the result that relative movement between the outer head 232 and the inner head 233 does not occur. The hinge device 230 may be configured such that a position where the inner head protrusions 233a contact the respective cam protrusions 234a is located within the free stop. In this case, the friction between the outer head 232 and the inner head 233 is generated due to the elastic force provided by the elastic spring 235 in the free stop, with the result that relative movement between the outer head 232 and the inner head 233 does not occur.

Specifically, the elastic spring 235 is maximally compressed in the free stop. The compressed elastic spring 235 provides elastic repulsive force to the cam 234, and the cam 234 pushes the inner head 233 by the elastic force of the elastic spring 235. Consequently, the inner head 233 comes into tight contact with the inside of the insertion hole 232c of the outer head 232, with the result that relative movement between the inner head 233 and the outer head 232 does not occur.

Figure 6:
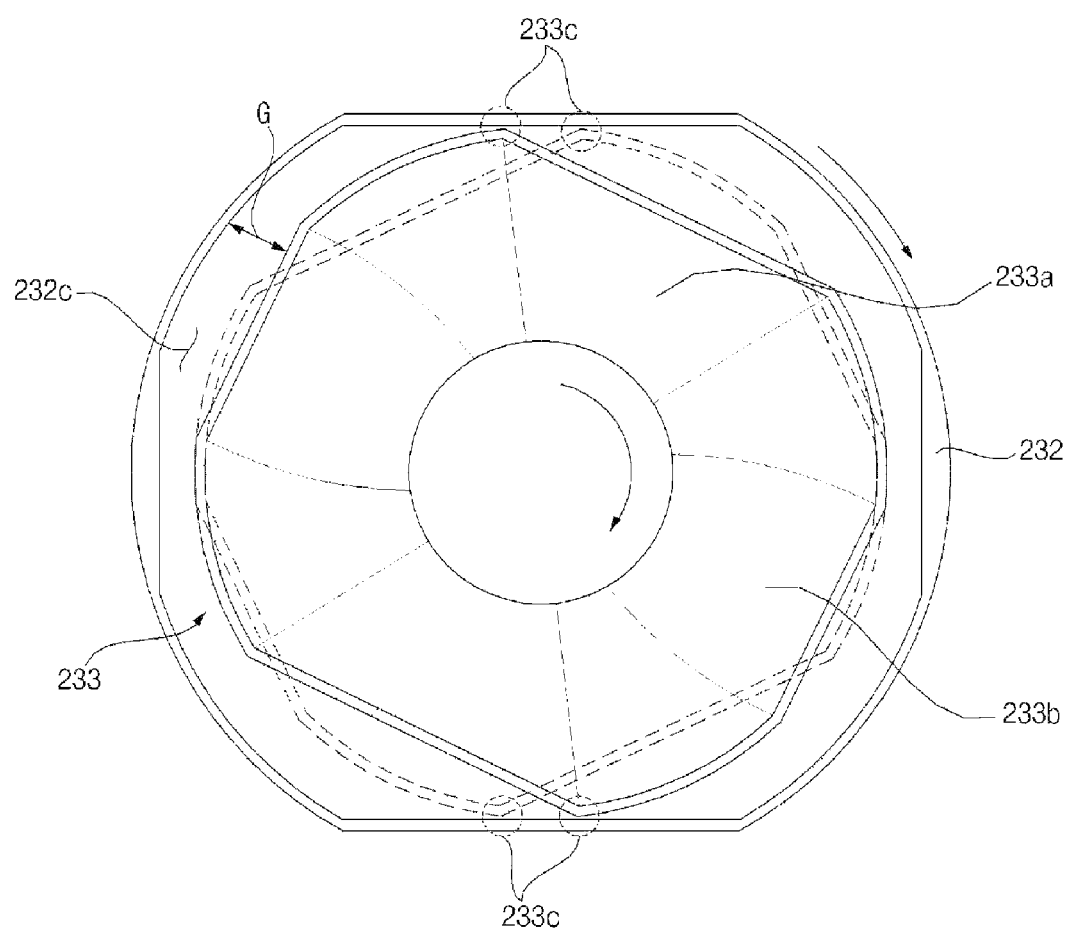
FIG. 6 is an operation view illustrating generation of a collision sound according to an embodiment of the present invention.

FIG. 6 is an operation view illustrating generation of a collision sound according to an embodiment of the present invention.

Referring to FIG. 6, the insertion hole 232c, in which the inner head 233 is received, is located at the inside of the outer head 232, and the inner head 233 is received in the insertion hole 232c such that one side of the inner head 233 is spaced apart from the insertion hole 232c. The gap G is defined between the inner head 233 and the insertion hole 232c at one side of the inner head 233. When the outer head 232 is rotated, therefore, an inner head corner 233c comes into contact with one side of the inner wall of the outer head 232 as indicated by a dotted line, with the result that the inner head 233 is rotated. This rotation is continued until the inner head protrusions 233a ride over the inclined planes extending from the cam depressions 234b to the cam protrusions 234a, and the flat planes of the cam protrusions 234a come into contact with the flat planes of the inner head protrusions 233a. When the hinge device 230 is configured such that a position where the inner head protrusions 233a contact the flat planes of the cam protrusions 234a is located within the free stop, the mobile terminal 100 is in an intermediate configuration, which does not correspond to the open configuration, in which the first body 100a and the second body 100b are at a predetermined angle, or the closed configuration.

When the outer head 232 is further rotated in the free stop, the inner head 233 is also rotated, with the result that the inner head protrusions 233a reach ends of the flat planes of the cam protrusions 234a and are located at the inclined planes toward the cam depressions 234b.

In this case, the inner head protrusions 233a are instantaneously moved downward along the inclined planes of the cam protrusions 234a, and the inner head corners 233c collide with the inner wall of the outer head 232 as indicated by a solid line, with the result that a collision sound is generated. That is, the inner head corners 233c are moved at the other side of the inner wall of the outer head 232 due to the gap G between the inner head 233 and the outer head 232. When the inner head protrusions 233a of the inner head 233 pass through the ends of the flat planes of the cam protrusions 234a and reach the inclined planes toward the cam depressions 234b due to the gap G, the coupling between the inner head 233 and the cam 234, which provides elastic force to the inner head 233, is instantaneously released. As a result, the inner head 233 is instantaneously moved relative to the outer head 232. At this time, the inner head corners 233c collide with one side of the inner wall of the outer head 232, with the result that a collision sound is generated.

Figure 7:
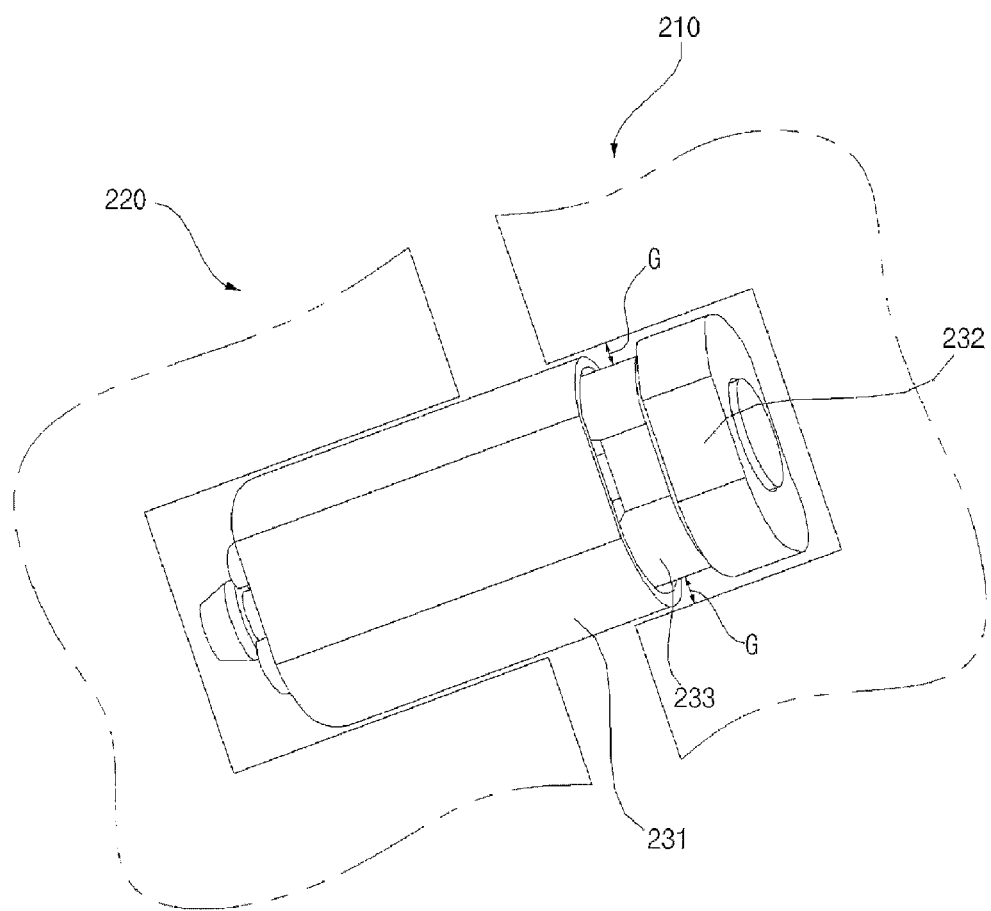
FIG. 7 is a perspective view illustrating a hinge device according to another embodiment of the present invention.

FIG. 7 is a perspective view illustrating a hinge device according to another embodiment of the present invention.

Referring to FIG. 7, the inner head 233 is mounted in the second body 100b such that one side of the inner head 233 is spaced apart from the second body 100b. When the inner head 233 is rotated, the inner head 233 collides with the second body 100b, thereby generating a collision sound. Specifically, the outer head 232 is fixedly mounted in the second body 100b. An insertion hole, in which the inner head 233 is received, is not formed in the outer head 232. That is, the outer head 232 does not surround the inner head 233. The outer head 232 fixes one side of the hinge device 230 to the second body 100b.

The inner head 233 has a smaller diameter than the outer head 232. Consequently, the inner head 233 is mounted in the outer head receiving part 212 such that the inner head 233 is spaced apart from one side of the outer head receiving part 212. Preferably, the outer diameter of the inner head 233 is less by a ratio of 5/100 than the inner diameter of the outer head 232.

In this case, the outer head 232 and the hinge housing 231 of the hinge device 230 are rotated while the outer head 232 is moved relative to the hinge housing 231, when the coupling unit 200 is rotated, with the result that the inner head 233 collides with one side of the inner wall of the outer head receiving part 212, thereby generating a collision sound.

More specifically, the embodiment of the present invention shown in FIG. 7 is different from the embodiment of the present invention shown in FIG. 6 in that the insertion hole 232 of the outer head 232 is replaced by the outer head receiving part 212.

Referring specifically to FIGS. 6 and 7, the inner head 233 is received in the outer head receiving part 212 formed in the protrusion 210 such that one side of the inner head 233 is spaced apart from the outer head receiving part 212, and the hinge housing 231 is fixedly coupled in the hinge housing receiving part 220. The gap G is defined between the inner head 233 and the outer head receiving part 212 at one side of the inner head 233. When the second body 100b having the outer head receiving part 212 formed therein is rotated, therefore, the inner head corner 233c comes into contact with one side of the inner wall of the outer head receiving part 212, with the result that the inner head 233 is rotated. This rotation is continued until the inner head protrusions 233a ride over the inclined planes extending from the cam depressions 234b to the cam protrusions 234a, and the flat planes of the cam protrusions 234a come into contact with the flat planes of the inner head protrusions 233a. When the hinge device 230 is configured such that a position where the inner head protrusions 233a contact the flat planes of the cam protrusions 234a is located within the free stop, the mobile terminal 100 is in an intermediate configuration, which does not correspond to the open configuration, in which the first body 100a and the second body 100b are at a predetermined angle, or the closed configuration.

When the second body 100b is further rotated in a state in which the second body 100b is located in the free stop, the inner head corners 233c come into contact with one side of the outer head receiving part 212, and therefore, the inner head 233 is rotated, with the result that the inner head protrusions 233a reach ends of the flat planes of the cam protrusions 234a and are located at the inclined planes toward the cam depressions 234b.

In this case, the inner head protrusions 233a are instantaneously moved downward along the inclined planes of the cam protrusions 234a, and the inner head corners 233c collide with the inner wall of the outer head receiving part 212, with the result that a collision sound is generated. That is, the inner head corners 233c freely move at the other side of the inner wall of the outer head receiving part 212 due to the gap G between the inner head 233 and the outer head receiving part 212. When the inner head protrusions 233a of the inner head 233 pass through the ends of the flat planes of the cam protrusions 234a and reach the inclined planes toward the cam depressions 234b due to the gap G, the coupling between the inner head 233 and the cam 234, which provides elastic force to the inner head 233, is instantaneously released. As a result, the inner head 233 is instantaneously moved relative to the outer head receiving part 212. At this time, the inner head corners 233c collide with one side of the inner wall of the outer head receiving part 212, with the result that a collision sound is generated.

According to another embodiment of the present invention, the outer head 232 may be fixedly coupled to the first body 100a, and the hinge housing 231 may be fixedly coupled to the second body 100b. Even in this case, the outer head 232 may be fixedly coupled in the hinge housing 231, and the inner head 233 may be mounted in the hinge housing receiving part 220 such that one side of the inner head 233 is spaced apart from the hinge housing receiving part 220. The inner head 233 is provided between the hinge housing 231 and the outer head 232. During rotation, the inner head 233 collides with one side of the inner wall of the hinge housing receiving part 220 in the same manner so as to generate a collision sound.

The mobile terminal 100 according to the present invention are not limited to the construction and operation disclosed in the embodiments as described above. All or some of the embodiments may be selectively combined to provide various modifications.

Meanwhile, it is possible for the present invention to be implemented as code, which can be read by a processor, such as a mobile station modem (MSM), of the mobile terminal 100, stored in recording media which can be read by the processor. The recording media which can be read by the processor may include all kinds of recording devices that can store data which can be read by the processor. Examples of the recording media which can be read by the processor may include a ROM, a RAM, a CD-ROM, magnetic tape, a floppy disc, an optical data storage device, and the like. In addition, it is possible for the present invention to be implemented in the form of a carrier wave, such as transmission through Internet. Also, the recording media which can be read by the processor may be distributed to computer systems connected to one another over a network such that codes which can be read by the processor can be stored and executed in a distributed manner.

As is apparent from the above description, the hinge device and the mobile terminal including the same according to the present invention have one or more effects as described below.

First, uniformity of a collision sound during folding of the mobile terminal is improved, and therefore, it is possible for a user to clearly hear a collision sound when opening or closing the mobile terminal.

Second, free movement of the mobile terminal in the free stop is prevented.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A mobile terminal comprising:
a first body forming an external appearance of the mobile terminal;
a second body rotatably coupled to the first body; the second body forming the external appearance of the mobile terminal; and
a coupling unit for rotatably coupling the first body and the second body to each other, the coupling unit comprising:
a hinge housing fixedly coupled to the first body;
an outer head fixedly coupled to the second body, the outer head having an insertion hole at an inside thereof;
an inner head disposed between the hinge housing and the outer head, and generating an audible collision sound during rotation of the inner head, the inner head being received in the insertion hole such that one side of the inner head is spaced apart from the insertion hole, and the inner head collides with the outer head, during rotation of the inner head, so as to generate the audible collision sound;
a cam mounted in the hinge housing and contacting the inner head; and
an elastic spring mounted in the hinge housing and providing elastic force to the cam.

2. The mobile terminal according to claim 1, wherein the cam reciprocates linearly along an inner circumference of the hinge housing.

3. The mobile terminal according to claim 1, wherein the inner head has a smaller diameter than the outer head such that a gap is defined between the inner head and the outer head.

4. The mobile terminal according to claim 1, wherein the inner head has an inner head protrusion, which protrudes in the shape of a peak, and an inner head depression, which is depressed in the shape of a valley.

5. The mobile terminal according to claim 4, wherein the inner head protrusion and the inner head depression linearly reciprocate the cam to an inside of the hinge housing during rotation of the inner head.

6. The mobile terminal according to claim 4, wherein the cam has a valley-shaped cam depression corresponding to the inner head protrusion and a peak-shaped cam protrusion corresponding to the inner head depression.

7. The mobile terminal according to claim 1, wherein the cam is formed such that a gap is not defined between the cam and the hinge housing at one side of the cam.

8. The mobile terminal according to claim 1, wherein the elastic spring provides friction between the outer head and the inner head during rotation of the outer head.

9. The mobile terminal of claim 1, wherein the outer head is exposed regardless of position of the first and second bodies.

10. A mobile terminal comprising:
a first body forming an external appearance of the mobile terminal: a second body rotatably coupled to the first body, the second body forming the external appearance of the mobile terminal; and
a coupling unit for rotatably coupling the first body and the second body to each other, the coupling unit comprising:
a hinge housing fixedly coupled to the first body;
an outer head fixedly coupled to the second body;
an inner head disposed between the hinge housing and the outer head, and generating an audible collision sound during rotation of the inner head, the inner head being mounted in the second body such that one side of the inner head is spaced apart from the second body, and the inner head collides with the second body, during rotation of the inner head, so as to generate the audible collision sound;

a cam mounted in the hinge housing and contacting the inner head, the inner head being located between the outer head and the cam; and an elastic spring mounted in the hinge housing and providing elastic force to the cam.

11. A hinge device for rotatably coupling a first body and a second body to each other, the hinge device comprising:

a hinge housing fixedly coupled to the first body;

an outer head fixedly coupled to the second body, the outer head having an insertion hole at an inside thereof;

an inner head disposed between the hinge housing and the outer head, and generating an audible collision sound during rotation of the inner head, the inner head being received in the insertion hole such that one side of the inner head is spaced apart from the insertion hole, and the inner head collides with the outer head, during rotation of the inner head, so as to generate the audible collision sound;

a cam mounted in the hinge housing such that the cam contacts the inner head; and an elastic spring mounted in the hinge housing and providing elastic force to the cam.

12. The hinge device according to claim 11, wherein the cam reciprocates linearly along an inner circumference of the hinge housing.

13. The hinge device according to claim 11, wherein the inner head has a smaller diameter than the outer head such that a gap is defined between the inner head and the outer head.

14. The hinge device according to claim 11, wherein the inner head has an inner head protrusion, which protrudes in the shape of a peak, and an inner head depression, which is depressed in the shape of a valley.

15. The hinge device according to claim 14, wherein the inner head protrusion and the inner head depression linearly reciprocate the cam to an inside of the hinge housing during rotation of the inner head.

16. The hinge device according to claim 14, wherein the cam has a valley-shaped cam depression corresponding to the inner head protrusion and a peak-shaped cam protrusion corresponding to the inner head depression.

17. The hinge device according to claim 11, wherein the cam is formed such that a gap is not defined between the cam and the hinge housing at one side of the cam.

18. The hinge device according to claim 11, wherein the elastic spring provides friction between the outer head and the inner head during rotation of the outer head.

19. The hinge device of claim 11, wherein the outer head is exposed regardless of position of the first and second bodies.

20. A hinge device for rotatably coupling a first body and a second body to each other, the hinge device comprising:

a hinge housing fixedly coupled to the first body;

an outer head fixedly coupled to the second body;

an inner head disposed between the hinge housing and the outer head, and generating an audible collision sound during rotation of the inner head, the inner head being mounted in the second body such that one side of the inner head is spaced apart from the second body, and the inner head collides with the second body, during rotation of the inner head, so as to generate the audible collision sound;

a cam mounted in the hinge housing such that the cam contacts the inner head, the inner head being located between the outer head and the cam; and an elastic spring mounted in the hinge housing and providing elastic force to the cam.

* * * * *